United States Patent
Shigemori et al.

(10) Patent No.: US 9,567,485 B2
(45) Date of Patent: Feb. 14, 2017

(54) COATING METHOD AND HARDENER FOR POLYURETHANE PAINT

(71) Applicant: Bayer MaterialScience AG, Monheim am Rhein (DE)

(72) Inventors: Tomokazu Shigemori, Amagasaki (JP); Hiroshi Morita, Shijonawate (JP)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/412,714

(22) PCT Filed: Jul. 3, 2013

(86) PCT No.: PCT/EP2013/064032
§ 371 (c)(1),
(2) Date: Jan. 5, 2015

(87) PCT Pub. No.: WO2014/009221
PCT Pub. Date: Jan. 16, 2014

(65) Prior Publication Data
US 2015/0147577 A1    May 28, 2015

(30) Foreign Application Priority Data

Jul. 9, 2012 (JP) ................................. 2012-153298
Nov. 9, 2012 (JP) ................................. 2012-247541

(51) Int. Cl.
| | | |
|---|---|---|
| C09D 175/04 | (2006.01) | |
| B05D 7/00 | (2006.01) | |
| C09D 175/06 | (2006.01) | |
| C08G 18/02 | (2006.01) | |
| C08G 18/79 | (2006.01) | |
| C08G 18/62 | (2006.01) | |
| C08G 18/73 | (2006.01) | |
| C08G 18/78 | (2006.01) | |
| C08G 18/80 | (2006.01) | |

(52) U.S. Cl.
CPC ............... *C09D 175/06* (2013.01); *B05D 7/53* (2013.01); *B05D 7/532* (2013.01); *C08G 18/02* (2013.01); *C08G 18/022* (2013.01); *C08G 18/6229* (2013.01); *C08G 18/6254* (2013.01); *C08G 18/73* (2013.01); *C08G 18/7818* (2013.01); *C08G 18/7831* (2013.01); *C08G 18/7837* (2013.01); *C08G 18/79* (2013.01); *C08G 18/791* (2013.01); *C08G 18/792* (2013.01); *C08G 18/80* (2013.01); *C08G 18/8061* (2013.01); *C09D 175/04* (2013.01); *Y10T 428/31551* (2015.04); *Y10T 428/31554* (2015.04)

(58) Field of Classification Search
CPC ........... B05D 7/53; B05D 7/532; C08G 18/02; C08G 18/022; C08G 18/6229; C08G 18/6254; C08G 18/73; C08G 18/7818; C08G 18/7831; C08G 18/7837; C08G 18/79; C08G 18/791; C08G 18/792; C08G 18/80; C08G 18/8061; C09D 175/04; C09D 175/06; Y10T 428/31551; Y10T 428/31554

USPC  427/407.1; 428/422.8, 423.1, 423.3; 528/44
See application file for complete search history.

(56) References Cited

U.S. PATENT DOCUMENTS

| | | | |
|---|---|---|---|
| 4,759,961 A | 7/1988 | Kato et al. | |
| 5,583,176 A | 12/1996 | Häberle | |
| 5,626,917 A | 5/1997 | Brock et al. | |
| 6,090,939 A | 7/2000 | Richter et al. | |
| 6,590,098 B2 | 7/2003 | Richter et al. | |
| 2004/0034162 A1* | 2/2004 | Laas et al. | 524/589 |
| 2004/0106762 A1 | 6/2004 | Charriere et al. | |
| 2009/0274846 A1* | 11/2009 | Wada et al. | 427/407.1 |
| 2011/0281965 A1 | 11/2011 | Laas et al. | |

FOREIGN PATENT DOCUMENTS

| | | |
|---|---|---|
| CA | 2244486 A1 | 2/1999 |
| EP | 0703255 A1 | 3/1996 |
| EP | 1287052 A1 | 3/2003 |
| JP | S61161179 A | 7/1986 |
| JP | H0415270 B2 | 3/1992 |
| JP | H09271714 A | 10/1997 |
| JP | H11152320 A | 6/1999 |
| JP | 2000086640 A | 3/2000 |
| JP | 2001226626 A | 8/2001 |
| JP | 2004534870 A | 11/2004 |
| JP | 4806511 B2 | 11/2011 |
| WO | WO-9907765 A1 | 2/1999 |

OTHER PUBLICATIONS

International Search Report for PCT/EP2013/064032 mailed Nov. 4, 2013.

* cited by examiner

*Primary Examiner* — Thao T Tran
(74) *Attorney, Agent, or Firm* — Drinker Biddle & Reath LLP

(57) ABSTRACT

[Problem] To increase adhesive strength between an aqueous base coat layer and a clear coat layer in a coating method by a two-coat one-bake system where an aqueous base coat paint is coated, then a clear coat paint is coated, and these two coated films are simultaneously hardened, in comparison with the conventional method.
[Solution] Provided is a coating method using a specific hardener in a clear coat paint. Namely, the hardener is characterized in that (1) it includes a reaction product of (i) a derivative of 1,6-hexamethylene diisocyanate including a trimer and virtually not including a diisocyanate monomer, and (ii) a compound having both an active hydrogen and a hydrophilic group; and (2) viscosity at 23° C. is not more than 1,000 mPa·s. The compound having both an active hydrogen and a hydrophilic group herein is a compound having an active hydrogen-containing group and a sulfo group represented by formula (I), and preferably the sulfo group in a hardener is neutralized with a tertiary amine.

$$X-R-SO_3H \qquad \text{Formula (I)}$$

(in the formula, X is an amino group, alkylamino group, cycloalkylamino group, or hydroxyl group, R is an aliphatic and/or alicyclic hydrocarbon group.)

5 Claims, No Drawings

COATING METHOD AND HARDENER FOR POLYURETHANE PAINT

CROSS-REFERENCE TO RELATED APPLICATIONS

This application is a national stage application (under 35 U.S.C. §371) of PCT/EP2013/064032, filed Jul. 3, 2013, which claims benefit of Japanese Application No. 2012-153298, filed Jul. 9, 2012, and Japanese Application No. 2012-247541, filed Nov. 9, 2012, all of which are incorporated herein by reference in their entirety.

TECHNICAL FIELD

The present invention relates to a paint having excellent physical properties such as high adhesive strength between coated films and high water resistance in a two-coat one-bake coating system in coating of steel plates and plastics of automobiles, home electric appliances, and the like.

BACKGROUND ART

In coating for steel plates and plastics of automobiles, home electric appliances and the like, for the purpose of shortening of coating process and energy saving, there have been a widely adopted coating method called a wet-on-wet system, or a two-coat one-bake system, occasionally, a three-coat one-bake system. In these coating systems, for the purpose of reducing volatile organic compound (VOC) reduction at the same time, for a paint used in a base coat layer of the two-coat one-bake system, and further for a paint used in a surfacer layer of the three-coat one-bake system, low VOC paints, for example, aqueous paints are often used.

However, since paints used in the aqueous base coat layer and aqueous surfacer layer have not reached the level of two-component reactive coated film in terms of coated film performance, there occur problems such as poor adhesiveness, solvent resistance, and water resistance, so methods for improving these drawbacks have been required.

In Patent documents 1 and 2, there is described a method in which a paint composed of a resin containing hydroxyl and carboxyl groups and a catalyst is coated as a base coat, next, a clear coat consisting mainly of a hydroxyl group-containing resin and a polyisocyanate compound is coated so that the isocyanate compound in the clear coat paint penetrates partly into the base coat layer to harden.

Patent document 3 describes that aiming at a similar effect of transferring an isocyanate compound in a clear coat partly into a base coat, as a hardener of the clear coat, a polyisocyanate containing 1 weight % or more, 70 weight % or less of dimer (also called uretdione) of 1,6-hexamethylene diisocyanate (hereinafter, also referred to as HDI) is used in a range of 1.2 to 3.0 in NCO/OH ratio.

In Patent documents 4 and 5, there is described a method for obtaining a water-dispersible polyisocyanate by reacting alkoxypolyalkylene glycol or a compound having an active hydrogen and a sulfo group with polyisocyanate.

PRIOR ART DOCUMENT

Patent Document

[Patent document 1] Japanese Unexamined Patent Publication No. Sho 61-161179

[Patent document 2] Japanese Unexamined Patent Publication No. Hei 9-271714

[Patent document 3] Japanese Unexamined Patent Publication No. 2001-226626

[Patent document 4] Japanese Examined Patent Publication No. Hei 4-15270

[Patent document 5] Japanese Patent No. 4806511

SUMMARY OF THE INVENTION

Problems to be Solved by the Invention

In the method of Patent documents 1 and 2, however, there is a case that an isocyanate compound does not penetrate enough to cross-link a base coat, causing problems in adhesiveness between coated film layers, solvent resistance and the like. In the method of Patent document 3, since isocyanate functionality of a dimer of 1,6-hexamethylene diisocyanate is 2, the degree of cross-linking in the coated film layer is low, leading to problems of inferior solvent resistance, weather resistance, and the like. In particular, in the case that a base coat is an aqueous paint, there has been a case that penetration of isocyanate is further insufficient in the above-described method.

Patent documents 4 and 5 do not intend to use the resulting water-dispersible polyisocyanate for improving interlayer adhesiveness between the clear coat layer and aqueous base coat layer in a two-coat one-bake system.

Means to Solve the Problems

The present inventors have found that by using a specific polyisocyanate as a hardener in a clear coat paint, the polyisocyanate in the clear coat penetrates well and efficiently into an aqueous base coat of the under layer to react with an isocyanate-reactive component in the aqueous base coat, thus, adhesive strength between the clear coat layer and base coat layer is greatly improved, and completed the present invention.

Embodiments of the present invention are as follows:

[Paragraph 1]

A coating method, which is a two-coat one-bake system comprising that an aqueous base coat paint is coated, without its hardening by cross-linking, subsequently a clear coat paint including a hardener and an active hydrogen-containing resin is coated on the base coat, then the base coat and clear coat are simultaneously hardened by cross-linking, characterized in that the clear coat paint is a two-component polyurethane paint with a mole ratio of 0.9 to 2.0 in NCO/H (active hydrogen), satisfying: (1) The hardener includes a reaction product of (i) a derivative of 1,6-hexamethylene diisocyanate including a trimer and virtually not including a diisocyanate monomer, and (ii) a compound having both an active hydrogen and a hydrophilic group; and (2) Viscosity of the hardener when it is not diluted with any organic solvent is not more than 1,000 mPa·s/23° C.

[Paragraph 2]

The coating method of paragraph 1, wherein the compound having both an active hydrogen and a hydrophilic group is a compound having an active hydrogen-containing group and a sulfo group represented by formula (I), and the sulfo group in a hardener is neutralized with a tertiary amine.

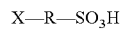  Formula (I)

(in the formula, X is an amino group, alkylamino group, cycloalkylamino group, or hydroxyl group, R is an aliphatic and/or alicyclic hydrocarbon group.)

[Paragraph 3]

The coating method of paragraph 1, 2, wherein the compound represented by formula (I) is 2-(cyclohexylamino)-ethane sulfonic acid and/or 3-(cyclohexylamino)-propane sulfonic acid.

[Paragraph 4]

The coating method of any one of paragraphs 1 to 3, characterized in that the aqueous base coat paint is an aqueous baking type paint containing an active hydrogen.

[Paragraph 5]

The coating method of any one of paragraphs 1 to 4, wherein the amount of trimers of 1,6-hexamethylene diisocyanate in the derivative of 1,6-hexamethylene diisocyanate is 55 weight % or more.

[Paragraph 6]

A hardener for a clear coat paint, which is used in the method of any one of paragraphs 1 to 5.

[Paragraph 7]

A multilayer coated film composed of the base coat layer and clear coat layer, which is obtained by the method of any one of paragraphs 1 to 5.

Effect of the Invention

Adhesive strength between an aqueous base coat layer and a clear coat layer is greatly improved, and excellent physical properties of coated film (for example, excellent water resistance and adhesiveness between layers) are obtained. This is thought as a result that because polyisocyanate of clear coat is hydrophilic, it penetrates well and efficiently into an aqueous base coat of the under layer to react with an isocyanate-reactive component in the aqueous base coat.

MODE FOR CARRYING OUT THE INVENTION

Hereinafter, the present invention is explained in detail.

The coating method of the present invention is a coating method of a two-coat one-bake system in which an aqueous base coat paint including an active hydrogen-containing resin is coated to form base coat, without hardening by cross-linking the base coat, subsequently a clear coat paint including a hardener and an active hydrogen-containing resin (two-component reactive polyurethane paint) is coated to form clear coat, then the base coat and clear coat are simultaneously hardened by cross-linking. This coating method is sometimes called a wet-on-wet system. The coating method of the present invention also includes some cases where the base coat is double layered to be a three-coat one-bake system, or multiple layered more than that.

After coating a base coat, usually, in order to prevent layer mixing with a clear coat to be coated later, it is preferable to evaporate volatile contents included in the base coat (for example, solvent, water) to some extent to dry up to finger-touch drying according to JIS K 5600-1-1 or up to an extent of half-hardening. Drying is conducted under the conditions of about 1 to 10 minutes (particularly about 3 minutes) at room temperature for a solvent of high volatility, and of about 1 to 10 minutes (particularly about 3 minutes) at about 50 to 100° C. for a solvent of low volatility, or for the case including water.

The heating condition after coating the clear coat is generally at a temperature of about 80 to 180° C. for about one minute to three hours (particularly about 10 to 60 minutes). When the heating condition is restricted, since the hardener for a clear coat paint of the present invention is reactive at room temperature, hardening can be done over a long time at room temperature without heating.

The present invention, in this coating method, relates to a hardener for a clear coat to form a polyurethane multilayer coated film, and to the formed multilayer coated film of polyurethane resin. The present inventors studied keenly on effective hardeners in this coating method, as a result, they have discovered that by selecting a specific polyisocyanate as a hardener for a clear coat, the hardener penetrates sufficiently into the aqueous base coat, further cross-links, as the result, the polyurethane multilayer coated film obtained can exhibit excellent water resistance and adhesiveness between layers, and completed the present invention.

The aqueous base coat paint includes an active hydrogen-containing resin. The clear coat paint (two-component polyurethane paint) includes a hardener and an active hydrogen-containing resin.

A specific hardener herein is a polyisocyanate satisfying all the following conditions.

The hardener is characterized in that (1) it includes a reaction product of (i) a derivative of 1,6-hexamethylene diisocyanate including a trimer and virtually not including a diisocyanate monomer, and (ii) a compound having both an active hydrogen and a hydrophilic group; and (2) Viscosity at 23° C. is not more than 1,000 mPa·s when it is not diluted with any organic solvent.

In this invention viscosity of hardener means the viscosity of hardener when it is not diluted with any organic solvent even if it is diluted in actual use.

The hardener is composed mainly of a polyisocyanate derived from HDI monomer (1,6-hexamethylene diisocyanate monomer) (hereinafter, such polyisocyanate is called HDI derivative). The polyisocyanate derived from HDI is preferably 60 weight % or more relative to the hardener, more preferably 70 weight % or more, and particularly 90 weight % or more, for example, 95 weight % or more. A polyisocyanate derived from diisocyanate monomers other than HDI (for example, aliphatic or alicyclic diisocyanate monomers such as isophorone diisocyanate, dicyclohexyl-methane-4,4'-diisocyanate, and norbornane diisocyanate) can also be used in a range satisfying the conditions of hardener in the present invention.

As auxiliary materials (generally, not more than 30 weight % in hardener) for synthesizing a polyisocyanate from diisocyanate monomers, there are listed a catalyst, co-catalyst, active hydrogen compound, reaction terminator and others being used for synthesis of the well-known polyisocyanate in the art, and these may be used as needed.

It is possible to mix a hardener with solvents inert to polyisocyanate (ethyl acetate, butyl acetate, toluene, xylene, solvent naphtha and others), but it is preferable not to use solvents from the point of VOC reduction.

In order to use the HDI derivative of the present invention industrially, it is preferable from the point of working environment not to virtually include diisocyanate monomers. "Not to virtually include diisocyanate monomers" means that the amount of diisocyanate monomers included in HDI derivatives is preferably 1 weight % or less, further preferably 0.5 weight % or less, and particularly 0.25 weight % or less. Ordinarily, this condition is satisfied by a distillation process for removing diisocyanate monomers under reduced pressure from a raw product obtained after completion of reaction.

The main component of HDI derivatives used in the present invention is a trimer of HDI. The trimer includes an isocyanurate structure of HDI and/or iminooxadiazinedione structure of HDI.

The trimer of HDI in the present invention means a polyisocyanate having an isocyanurate structure group formed by trimerization of HDI, or an iminooxadiazinedione structure group being an isomeric structure of an isocyanurate structure group. In the art, as a polyisocyanate component composed of HDI, a biuret structure group and/or an allophanate structure group have been widely utilized, but for forming these biuret structure group and allophanate structure group, elimination of CO2 and/or addition of alcohols are involved, thus, these are not referred to the trimer of HDI in the present invention. Uretdione is a dimer formed by dimerization addition of HDI.

In the actual synthesis of HDI derivatives, a composition of the higher molecular side product exceeding a trimer is often produced. For example, it may be a pentamer and heptamer of HDI having isocyanurate groups. These have an isocyanurate structure, but are not a trimer of course, therefore do not fall under the category of trimer of HDI in the present invention.

Regarding the production method of HDI derivatives used in the present invention, any method is adopted as long as the production method produces an isocyanurate structure group and/or iminooxadiazinedione structure group by using HDI. For example, there are listed the publicly known methods described in Japanese Unexamined Patent Publications No. Hei 11-152320 (1999), No. 2000-086640, Japanese translation of PCT publication No. 2004-534870, US Patent No. 2011/0281965, and others.

As a specific example of the production method of HDI derivatives, there are listed a production method (Japanese Unexamined Patent Publication No. Hei 11-152320) characterized by oligomerization under the presence of hydrogen polyfluoride oligomerizing catalyst, a method (Japanese Unexamined Patent Publication No. 2000-086640) by trimerization under the presence of quaternary ammonium and phosphonium fluoride trimerizing catalyst, and a method (Japanese translation of PCT publication No. 2004-534870) by trimerization under the presence of catalyst being a salt-like compound having a 1,2,3- and/or 1,2,4-triazolate structure.

The amount of HDI trimers in HDI derivatives is preferably 55 weight % or more relative to the HDI derivatives. When the amount of HDI trimers is 55 weight % or more, since penetration of hardener in a clear coat into a base coat takes place sufficiently, and the average functionality including the components of pentamer and heptamer is 3 or more, physical properties of coated film after baking become sufficient.

As a component other than HDI trimer, there is a dimer. However, since the dimer (uretdione) is difunctional, cross-linking performance of coated film is poor, water resistance, adhesiveness between layers and the like are inferior. As components other than that, there is a polyisocyanate having the foregoing biuret structure group or allophanate structure group. As for the polyisocyanate with a biuret structure as the main component, the viscosity becomes 1,000 mPa·s/23° C. or more, and penetration into the under layer (base coat) becomes insufficient. As for the polyisocyanate with an allophanate structure as the main component, the viscosity can be reduced, but functionality lowers if monoalcohols are incorporated, in the same way, as the dimer, thus, cross-linking performance of coated film is poor, water resistance, adhesiveness between layers and the like are inferior. The degree of penetration into the under layer is also low.

The hardener further includes the above-described reaction product of a HDI derivative and a compound having both an active hydrogen and a hydrophilic group. Examples of the hydrophilic group are alkoxypolyalkyleneoxy group (carbon number of 2 to 50 for example), and/or a carboxyl group, sulfo group, and their salts (for example, metal salt, ammonium salt, amine salt).

The compound having both an active hydrogen and a hydrophilic group is preferably a compound having both an active hydrogen-containing group and a sulfo group in a molecule. In particular, a compound having both an active hydrogen-containing group and a sulfo group shown by the following formula (I) is preferable.

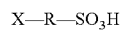
$$X—R—SO_3H \qquad \text{Formula (I)}$$

(in the formula, X is an amino group, alkylamino group, cycloalkylamino group, or hydroxyl group, R is an aliphatic and/or alicyclic hydrocarbon group.)

The carbon number of alkylamino group may be 1 to 8, and the carbon number of cycloalkylamino group may be 4 to 8.

Compound (I) is a compound having both an active hydrogen-containing group and a sulfo group in a molecule. The active hydrogen-containing group is preferably an amino group or hydroxyl group. R 6 is preferably an aliphatic hydrocarbon group with the carbon number of 1 to 8 and/or an alicyclic hydrocarbon group with the carbon number of 4 to 8.

Examples of the compound (I) includes hydroxyethane sulfonic acid, 3-hydroxypropane sulfonic acid disclosed in European Patent No. 0703255, and 2-(cyclohexylamino)-ethane sulfonic acid, 3-(cyclohexylamino)-propane sulfonic acid disclosed in European Patent No. 1287052. Among these, 2-(cyclohexylamino)-ethane sulfonic acid and 3-(cyclohexylamino)-propane sulfonic acid are preferable.

In the present invention, it is preferable that the sulfo group of compound (I) and/or that derived from a compound (I) in a hardener is neutralized with a tertiary amine. The tertiary amine is, for example, tertiary monoamines such as trimethylamine, triethylamine, tripropylamine, tributylamine, dimethylcyclohexylamine, N-methylmorpholine, N-ethylmorpholine, N-methylpiperidine, and N-ethyl-piperidine: or tertiary diamines such as 1,3-bis-(dimethylamino)-propane, 1,4-bis(dimethylamino)-butane, and N,N'-dimethylpiperazine. A tertiary amine having an isocyanate-reactive group is also suitable, but a neutralized amine, for example, alkanolamine, specifically, dimethylethanolamine, methyldiethanolamine, or triethanolamine is low in basicity, thus it is rather not preferable.

These tertiary amines are used in such amount that the equivalent ratio to a sulfo group is 0.2 to 2.0, preferably 0.5 to 1.5.

The hardener includes a reaction product of an HDI derivative and compound (I), one in which a sulfo group of compound (I) has been neutralized beforehand with a tertiary amine may be used, or an HDI derivative, compound (I), and a tertiary amine may be reacted at the same time in-situ. It is not preferable that after reaction of an HDI derivative and compound (I), a tertiary amine is added to neutralize a sulfo group derived from compound (I), because there is a case where an isocyanate group in the HDI derivative reacts with the sulfo group, and the isocyanate group is consumed unnecessarily.

The reaction of an HDI derivative and compound (I), and possibly with a tertiary amine is done at 40 to 150° C., preferably 50 to 130° C., further preferably 60 to 100° C., while the equivalent ratio of isocyanate group and active hydrogen is observed in a range of 2:1 to 400:1, preferably 4:1 to 250:1, preferably, their reaction is carried out till reaching the isocyanate content theoretically calculated. In this case, there may be used a catalyst, co-catalyst, active hydrogen compound, and co-solvent used for synthesis of the well-known polyisocyanate in the art.

The hardener needs to satisfy the viscosity being not more than 1,000 mPa·s/23° C. Generally, the viscosity is preferably 300 to 1,000 mPa·s/23° C.

In the case not satisfying the conditions of hardener in the present invention, because the functionality lowers, or the degree of penetration into the under layer consisting of aqueous base coat is insufficient, water resistance of coated film, adhesiveness between layers and the like cannot be sufficiently obtained.

On the other hand, various modified-type polyisocyanates other than a trimer and dimer of HDI can be used in a range satisfying the conditions of hardener in the present invention. A hardener satisfying the conditions of hardener in the present invention may be prepared by mixing various modified-type polyisocyanates.

The ratio of polyisocyanate used in the present invention to an active hydrogen-containing resin used in a clear coat is 0.9 to 2.0 in a mole ratio represented by NCO/H (isocyanate group/active hydrogen), and particularly, a range of 0.9 to 1.5 in NCO/H ratio is preferable. A range of 1.0 to 1.2 in NCO/H mole ratio is further preferable.

When the mole ratio is less than 0.9, since the amount of polyisocyanate transferred from a clear coat to a base coat becomes small, sufficient cross-linking cannot be formed, water resistance, adhesiveness between layers and the like deteriorate. The polyisocyanate of the present invention is high in functionality, and high-performance coated film can be formed with a small amount of penetration, thus, it needs no excessive NCO/H mole ratio. On the other hand, when more than 2.0, retardation of reactivity occurs due to an excessive polyisocyanate, and also this is not preferable economically. In the present invention, sufficiently high physical properties of coated film can be exhibited by an NCO/H mole ratio of 0.9 to 1.5.

The aqueous base coat paint includes an active hydrogen-containing resin preferably being water dispersible, and water. A resin used in the aqueous base coat paint generally includes a water-dispersible resin containing an isocyanate-reactive active hydrogen. As the water-dispersible resin, specifically there is listed a resin having a hydrophilic group such as carboxyl group and sulfo group, and an active hydrogen such as hydroxyl group and amino group. As a resin used in the aqueous base coat paint, there can be used a water-dispersible acrylic resin, water-dispersible polyester resin, water-dispersible alkyd resin, water-dispersible polyurethane resin and the like, containing an active hydrogen, used in the art. In particular, a water-dispersible hydroxyl group-containing acrylic resin is suitable. For example, the content of active hydrogen is preferably 0.01 to 2 weight %. In the present description, "content of active hydrogen" means a weight ratio (weight %) of active hydrogen atom to the weight of resin. Generally, the content of hydroxyl group is 0.1 to 15 weight % and preferably 0.2 to 10 weight %. Generally, there is used a resin with an acid value of 0 to 60 mgKOH/g, preferably 0 to 40 mgKOH/g, a number-averaged molecular weight of 500 to 1,000,000, and preferably 2,000 to 300,000. In the aqueous base coat paint, the amount of water may be 10 to 90 weight % based on the aqueous base paint.

The combination of an active hydrogen-containing resin and a melamine resin can be also used. As the melamine resin, an alkyl-etherified melamine resin suitable for water-solubilization is preferable. The mixing ratio of an active hydrogen-containing resin and a melamine resin is preferably 100:3 to 100:60 in the weight ratio of nonvolatile contents. In the aqueous base coat paint, the content of active hydrogen-containing resin in the whole resin is 10 to 100 weight % based on the whole resin, particularly, 60 to 100 weight % is preferable.

As the aqueous base coat paint, there can be also used one kind or more of the foregoing active hydrogen-containing resins and a blocked polyisocyanate as an one-component baking paint according to need. As blocked polyisocyanates, they are polyisocyanates having any one of biuret, isocyanurate, urethane, uretdione, allophanate groups obtained from 1,6-hexamethylene diisocyanate and/or isophorone diisocyanate, which are blockaded with oximes, lactams, active methylene containing compounds, pyrazoles and the like being well-known blocking agents, for example, the polyisocyanates can be blocked with compounds such as 2-butanone oxime, ethyl acetoacetate, diethyl malonate, and dimethylpyrazole. In view of aqueous base coat paint, a water-dispersible blocked polyisocyanate having a hydrophilic group is preferable. These blocked polyisocyanates can be arbitrarily selected according to the baking conditions and added amount.

In the case of using a blocked polyisocyanate, the ratio of the active hydrogen-containing resin and blocked polyisocyanate is preferably not more than 0.8 in the mole ratio of effective NCO/H. As an aqueous base coat paint, there can be also used a solid color paint using an inorganic and organic pigment used usually in the field, a metallic paint and pearl paint using metal fine powder such as scale-like aluminum and micaceous iron oxide.

In a resin for an aqueous base coat paint, in order to promote hardening of polyisocyanate transferred from a clear coat, and hardening of blocked polyisocyanate blended in a base paint, there may be included a hardening catalyst used in the field, for example, an organic metal compound, acidic phosphate ester, and tertiary amine compound. These compounds may include, for example, dibutyltin dilaurate, dioctyltin dilaurate, dibutyltin diacetate, tetrabutyldiacetoxydistannoxane, lead naphthenate, cobalt naphthenate, lead 2-ethylhexanoate, iron 2-ethylhexanoate, monobutyl phosphate, phosphoric acid dibutoxy ester, and triethylenediamine.

A resin used in a clear coat paint comprises a resin containing isocyanate-reactive active hydrogen. Specifically, a resin containing a hydroxyl group or amino group is listed. There can be used an acrylic resin, polyester resin, alkyd resin, polyurethane resin and the like, containing an active hydrogen used in the art. The active hydrogen in an active hydrogen-containing resin used in the clear coat paint is preferably a hydroxyl group. In particular, a hydroxyl group-containing acrylic resin is suitable. For example, there is used the one with the content of active hydrogen of 0.01 to 2 weight %, preferably 0.02 to 1 weight %, an acid value of 0 to 60 mgKOH/g, preferably 0 to 40 mgKOH/g, and a number-averaged molecular weight of 500 to 50,000, preferably 500 to 20,000. For example, when an active hydrogen-containing resin has a hydroxyl group, the content of hydroxyl group is 0.1 to 15 weight %, preferably 0.2 to 10 weight %.

In the clear coat paint, there may be added a hardening catalyst used in the field in the same way as the aqueous base coat paint, for example, an organic metal compound, acidic phosphate ester, and tertiary amine compound. The clear coat paint may include an organic solvent. The amount of organic solvent is 95 weight % or less based on the clear coat paint, for example, may be 10 to 90 weight %.

The coating method is not particularly limited, an atomizing system, brush coating, roll coating, dip coating, doctor blade coating, and the like can be applied. Among these, in particular, an atomizing system such as air-assist spray, airless spray, and electrostatic spray coating are preferable. Regarding dry film thickness, it is preferable to coat so as to be 5 to 100 nm, preferably 10 to 30 μm for a base coat layer, and 5 to 200 μm, preferably 20 to 80 μm for a clear coat layer.

A substrate to be coated may be various materials, for example, metal and resin (for instance plastic).

EXAMPLES

Next, the present invention is further specifically explained by Examples, but the present invention is by no means restricted by Examples. Representation of "%" means "weight %" unless otherwise specified.

Evaluation was carried out in accordance with the following criteria for each characteristic.
<Measurement of Content of Trimer and Dimer in HDI Derivative>

It was obtained by an efflux area percentage obtained through measurement by gel permeation chromatography (GPC). The peak of the molecular weight corresponding to a trimer or dimer of HDI is defined as trimer. The measurement conditions are as follows.

Instrument: HLC-8120GPC manufactured by Tosoh Corporation
Column: Shodex KF601, 602, 603 each piece
Carrier: Tetrahydrofuran
Detection method: Differential refractive index detector
Pretreatment: Active NCO group was deactivated by the reaction with methanol before the measurement.
Molecular weight: Polypropylene glycol (PPG) reduction
<Measurement of Molecular Weight of Acrylic Resin>
Molecular weight of acrylic resin was measured by the same GPC method as described above except the pretreatment of active NCO group.
<Measurement of Viscosity of Hardener>
Viscosity of hardener was measured according to DIN EN ISO 3219/A.3 at 23° C.
<Evaluation on Penetrability of Polyisocyanate from Clear Coat Layer to Base Coat Layer>

A base coat and a clear coat were sequentially coated on a polypropylene plate to obtain a multilayer coated film by a two-coat one-bake system (see the method described in Example 1). The resulting coated film was kept at normal temperature, then, peeled out of the polypropylene plate. Within one hour after baking, infrared absorption spectrum (IR) of coated film of the base coat on the polypropylene plate surface side was measured in a peak height at the following wavelengths, and IR absorption peak height ratios (%) of 2270 cm-1 to 2930 cm-1 and 700 cm-1 were calculated. The higher these ratios, the higher the penetration efficiency of polyisocyanate.

Wavelength 2930 cm-1 (C—H stretching vibration absorption)
Wavelength 2270 cm-1 (isocyanate group —N=C=O stretching vibration absorption)
Wavelength 700 cm-1 (aromatic ring absorption)
In the infrared absorption spectrum (IR) measurement, as an instrument, Nicolet 6700FT-IR manufactured by Thermo Fisher Scientific K. K. was used.

Regarding the determination, when the peak height ratio (%) becomes not less than 3 times the blank test that no clear coat is coated (high penetrability), it denotes "o", and when less than 3 times the blank (low penetrability), "x."
<Appearance of Coated Film (Early Phase)>

The appearance of multilayer coated film obtained was measured using a gloss meter (Microtrigloss, 4520) manufactured by BYK Gardner Corp. by gloss values at 20° and 60° in reflecting angle. Further, it was evaluated by visual observation according to the following criteria.
o: Smoothness is good.
Δ: Smoothness is intermediate between "good" and "bad."
x: Smoothness is bad.

Water resistance of multilayer coated film was measured by appearance, gloss retention, adhesiveness between multilayers after immersion in water, and cohesion failure property.
<Appearance (Water Resistance)>

On a polypropylene plate coated with a primer for polypropylene, a base coat and a clear coat were sequentially coated to obtain a multilayer coated film by a two-coat one-bake system (see the method described in Example 1). The resulting polypropylene coated film plate was immersed in warm water at 40° C. for 240 hours, and picked up, dried at room temperature for 12 hours, then appearance of the multilayer coated film was evaluated by visual observation in accordance with the following criteria.
o: There is no abnormality,
Δ: Blisters are observed overall.
x: Large blisters are observed overall, and/or the whole surface is not glossy.
<Gloss Retention (Water Resistance)>

The appearance of this multilayer coated film was measured using a gloss meter (Microtrigloss, 4520) manufactured by BYK Gardner Corp. by gloss values at 20° and 60° in reflecting angle. From the ratio of these values and the gloss values obtained by the above-described <appearance of coated film> evaluation, gloss retention at respective reflecting angles was calculated, and evaluated in accordance with the following criteria.
o: Gloss retention of 90% or more
Δ: Gloss retention of 70% or more and less than 90%
x: Gloss retention of less than 70%
<Adhesiveness Between Multilayers after Immersion in Water (Water Resistance)>

The coated film evaluated by the above-described method was cut with a utility knife so as to reach the substrate, 100 grids of 2 mm×2 mm size were made, and an adhesive cellophane tape was attached on the coated surface. After the tape was rapidly peel off at 20° C., the coated surface was evaluated in accordance with the following criteria.
o: Grids of coated film remain in 100 pieces.
Δ: Grids of coated film are peeled off by 1 to 10 pieces.
x: Grids of coated film are peeled off by 11 pieces or more.
<Cohesion Failure Property (Water Resistance)>

Regarding the sample after the above-described evaluation of adhesiveness between multilayers after immersion in water, the failure state of the grids of coated film was evaluated in accordance with the following criteria.
o: No failure is observed at all inside the base coated film.
x: Failure is clearly observed inside the base coated film.

For Examples and Comparative examples, the following each material was prepared beforehand.
Acrylic polyol A (for base coat)
Bayhydrol A2427 (manufactured by Bayer Material Science AG)
Water-dispersible hydroxyl group-containing acrylic polyol, nonvolatile content 42%, hydroxyl group content 2% (in terms of nonvolatile content), viscosity 100 mPa·s/23° C., pH 8-9, glass transition temperature 87° C., molecular weight Mw/Mn=240,000/22,000
Aluminum flake (for base coat)
EMR D5660 (manufactured by Toyo Aluminum K.K.)
Thickener (for base coat)
Viscalex HV30 (manufactured by Ciba Specialty Chemicals Inc.)
Surfactant A (for base coat)
A mixture of surfactant BYK347 (manufactured by BYK Corp.) and surfactant Disperlon AQ320 (manufactured by Kusumoto Chemicals, Ltd.) by 1:1
Co-solvent (for base coat)
Butyl glycol
Neutralizing agent (for base coat)
Dimethylethanolamine
Acrylic polyol B (for clear coat)
Desmophen A870 (manufactured by Bayer Material Science AG)
Butyl acetate solution with nonvolatile content of 70%, hydroxyl group content 2.95% as it is, glass transition temperature 27° C., viscosity 3,500 mPa·s/23° C., acid value 7.5 mgKOH/g, and molecular weight Mw/Mn=3,400/1,650
Surfactant B (for clear coat)
BYK331 being surfactant (manufactured by BYK Corp.)
Leveling agent (for clear coat)
Modaflow (manufactured by Monsanto Corporation)
Solvent (for clear coat)
Methoxypropyl acetate/butyl acetate=1/1 solution Synthesis Example 1

Synthesis of HDI Derivative (P-1)

A three-necked flask equipped with a stirring device was filled with nitrogen, 200 g of HDI was put therein and kept at 60° C. Next, as a catalyst, 50% solution of tetrabutyl phosphonium hydrogen difluoride in isopropanol/methanol (2:1) was added dropwise over 4 hours until the NCO content of coarse reaction mixture became 43%. Thereafter, the reaction was stopped by adding dibutyl phosphate of 103 mg. From this, HDI monomer was removed by thin-film distillation at 130° C./0.2 millibars, thereby obtaining a transparent and colorless polyisocyanate with the following data.
Nonvolatile content: 100% (containing no solvent)
NCO content: 23.4%
Viscosity: 680 mPa·s/23° C.
Trimer content: 68 weight %
HDI monomer content: 0.2 weight %

Synthesis Example 2

Synthesis of HDI Derivative (P-2)

A three-necked flask equipped with a stirring device was filled with nitrogen, 1000 g of HDI was put therein and kept at 60° C. To this, 10 g of 1,3-butanediol as a co-catalyst and 3 g of tri-n-butylphosphine as a catalyst were added. Next, this mixture was kept at 60° C., and the reaction was conducted for 4 hours to obtain a raw reaction mixture with an NCO content of 40%. The reaction was stopped by adding methyl p-toluenesulfonate of 2.8 g thereto. After the mixture was subjected to thin-layer distillation at 130° C. and pressure 0.15 mbar, a transparent and colorless polyisocyanate with the following data was obtained.
Nonvolatile content: 100% (containing no solvent)
NCO content: 21.8%
Viscosity: 200 mPa·s/23° C.
Trimer content: 24 weight %
Dimer content 38 weight %
HDI monomer content: 0.2 weight %

Synthesis Example 3

Synthesis of Hardener (H-1)

A three-necked flask equipped with a stirring device was filled with nitrogen, and to a mixture of 800 g of HDI derivative (P-1) obtained in Synthesis example 1 with 200 g of HDI derivative (P-2) obtained in Synthesis example 2, 10 g of 3-cyclohexylaminopropane sulfonic acid and 6 g of dimethylcyclohexylamine were added, and the reaction was conducted under nitrogen stream at 80° C. for 10 hours. After cooling down to room temperature, a transparent and colorless polyisocyanate with the following data was obtained.
Nonvolatile content: 100% (containing no solvent)
NCO content: 22.6%
Viscosity: 650 mPa·s/23° C.
Trimer content: 59 weight % (in HDI derivative)
HDI monomer content: 0.2 weight %

Synthesis Example 4

Synthesis of Hardener (H-2)

A three-necked flask equipped with a stirring device was filled with nitrogen, and to a mixture of 400 g of isocyanurate group-containing polyisocyanate produced from hexamethylene diisocyanate, having an isocyanate content of 21.7% and a viscosity of 3,000 mPa·s (23° C.) with 600 g of HDI derivative (P-1) obtained in Synthesis example 1, 30 g of 3-cyclohexylaminopropane sulfonic acid and 18 g of dimethylcyclohexylamine were added, and the reaction was conducted under nitrogen stream at 80° C. for 10 hours. After cooling down to room temperature, a transparent and colorless polyisocyanate with the following data was obtained.
Nonvolatile content: 100% (containing no solvent)
NCO content: 21.2%
Viscosity: 3,500 mPa·s/23° C.
Trimer content: 58 weight % (in HDI derivative)
HDI monomer content: 0.2 weight %

Synthesis Example 5

Synthesis of Hardener (H-3)

A three-necked flask equipped with a stirring device was filled with nitrogen, and to 1,000 g of isocyanurate group-containing polyisocyanate produced from hexamethylene diisocyanate, having an isocyanate content of 21.7% and a viscosity of 3,000 mPa·s (23° C.), in place of a compound of formula (I), 145 g of monofunctional methoxypolyethylene glycol having an average molecular weight of 350 was added at room temperature while it was stirred. Next, this mixture was heated at 100° C. for 3 hours. After cooling down to room temperature, a practically transparent and colorless polyisocyanate mixture was obtained. The isocyanate content was 17.3% and viscosity was 3,050 mPa·s (23° C.). To 700 g of the resulting polyisocyanate, 300 g of HDI derivative (P-2) was added, and stirred under nitrogen stream at 40° C. for 1 hour. After cooling down to room temperature, a transparent and colorless polyisocyanate with the following data was obtained.
Nonvolatile content: 100% (containing no solvent)
NCO content: 19.0%
Viscosity: 800 mPa·s/23° C.
Trimer content: 43 weight % (in HDI derivative)
HDI monomer content: 0.2 weight %

Characteristics of each hardener such as NCO group content, viscosity and composition are shown in Table 1.

Example 1

Base coat composition BC-1 (nonvolatile content of about 22%, Ford cup No. 4 efflux time of 50 to 60 seconds) shown in Table 1 was prepared. This was spray-coated on a polypropylene plate for the dry film thickness to be 15 to 20 microns, after being at room temperature for 3 minutes, this was further dried at 80° C. for 3 minutes to obtain coated film of the base coat. Next, clear coat composition CC-1 shown in Table 4 was prepared. To this, hardener A was mixed for the NCO/OH mole ratio to be 1.0, obtaining a paint with a nonvolatile content of about 50% and Ford cup No. 4 efflux time of 18 to 22 seconds. This paint was spray-coated on the above-described base coat coated film for the dry film thickness to be about 40 microns. After being left at room temperature for 3 minutes, this was baked at 100° C. for 20 minutes. After cooling down to room temperature, the coated film was peeled off from the polypropylene plate.

The penetration ratio of isocyanate group of base coat coated film on the polypropylene plate surface side was measured by the above-described infrared absorption spectrum (hereinafter, abbreviated as IR) method, and the degree of penetration of polyisocyanate from the clear coat to the base coat was measured.

As a blank test, the coated film obtained by forming a coated film of a base coat alone and drying it was subjected to the same operation to measure the IR absorption ratio.

A primer for polypropylene was prepared by mixing a commercially available chlorinated polyolefin resin with an aqueous polyurethane resin (Dispercoll U54 manufactured by Bayer Material Science AG). This was coated on a polypropylene plate, after being left at room temperature for 3 minutes, dried at 80° C. for 3 minutes. Thereafter, by the method shown above, a base coat and a clear coat were sequentially coated, and baked, thereby obtaining a target coated film. The coated film was evaluated by appearance, gloss retention, adhesiveness between multilayers after immersion in water, and cohesion failure property.

Examples 1 to 3, and Comparative Examples 1 to 4

Experiments were conducted according to Example 1 by changing the loads of each component as shown in the base coat composition, clear coat composition, the use amount of hardener, and NCO/OH mole ratio of Tables 2 to 3.

The results are shown by IR absorption ratio, penetrability evaluation, coated film appearance, gloss retention, adhesiveness between multilayers after immersion in water, and cohesion failure property in Table 4.

TABLE 1

| | Hardener | | | |
|---|---|---|---|---|
| | H-1 | H-2 | H-3 | P-2 |
| Compound (I) | Cyclohexyl-aminopropane sulfonic acid | Cyclohexyl-aminopropane sulfonic acid | None | None |
| Alkoxypoly-alkyleneglycol | None | None | Methoxy-polyethyl-eneglycol | None |
| NCO group content (%) | 22.5 | 21.2 | 19.0 | 21.8 |
| Viscosity (mPa · s/23° C.) | 650 | 3,500 | 800 | 200 |
| Trimer content in HDI derivative (%) | 59 | 58 | 43 | 24 |
| HDI monomer content (%) | 0.2 | 0.2 | 0.2 | 0.2 |

TABLE 2

| Base coat composition (part by weight) | BC-1 |
|---|---|
| Acrylic polyol A | 32.0 |
| Aluminum flake | 5.7 |
| Thickener | 3.5 |
| Surfactant A | 0.9 |
| Co-solvent | 7.4 |
| Neutralizing agent | 0.6 |
| Ion-exchanged water | 47.4 |

TABLE 3

| Clear coat composition (part by weight) | CC-1 |
|---|---|
| Acrylic polyol B | 55.0 |
| Surfactant B | 0.55 |
| Leveling agent | 0.55 |
| Solvent | 38.6 |

TABLE 4

| | Example 1 | Example 2 | Example 3 | Comparative example 1 | Comparative example 2 | Comparative example 3 | Comparative example 4 |
|---|---|---|---|---|---|---|---|
| Hardener | H-1 | H-1 | H-1 | H-1 | H-2 | H-3 | P-2 |
| Base coat | BC-1 | BC-1 | BC-1 | BC-1 | BC-1 | BC-1 | BC-1 |
| Clear coat | CC-1 | CC-1 | CC-1 | CC-1 | CC-1 | CC-1 | CC-1 |
| NCO/OH mole ratio of clear coat | 1.0 | 1.2 | 1.5 | 0.7 | 1.0 | 1.0 | 1.0 |
| IR absorption ratio (%) 2270 cm$^{-1}$/2930 cm$^{-1}$ | 47 | — | — | — | 10 | 7 | 49 |
| IR absorption ratio (%) 2270 cm$^{-1}$/700 cm$^{-1}$ | 32 | — | — | — | 7 | 6 | 61 |
| Penetrability evaluation | ○ | — | — | — | x | x | ○ |

TABLE 4-continued

|  |  | Example 1 | Example 2 | Example 3 | Comparative example 1 | Comparative example 2 | Comparative example 3 | Comparative example 4 |
|---|---|---|---|---|---|---|---|---|
| Early phase | Appearance by visual observation | ○ | ○ | ○ | ○ | ○ | ○ | ○ |
|  | 20° Gloss value | 89 | 89 | 87 | 91 | 93 | 87 | 92 |
|  | 60° Gloss value | 100 | 95 | 97 | 98 | 99 | 99 | 99 |
| Water resistance | Appearance by visual observation | ○ | ○ | ○ | Δ | ○ | Δ | Δ |
|  | 20° Gloss retention (%) | 100 | 98 | 97 | 85 | 99 | 100 | 57 |
|  | Evaluation on 20° gloss retention | ○ | ○ | ○ | Δ | ○ | ○ | x |
|  | 60° Gloss retention (%) | 100 | 99 | 97 | 92 | 99 | 98 | 85 |
|  | Evaluation on 60° gloss retention | ○ | ○ | ○ | ○ | ○ | ○ | Δ |
|  | Adhesiveness between multi-layers after immersion in water | ○ | ○ | ○ | ○ | ○ | ○ | ○ |
|  | Cohesion failure property | ○ | ○ | ○ | ○ | ○ | ○ | ○ |

From the above-described results, it is known that Examples 1 to 3 show high IR absorption ratio at an NCO/OH mole ratio: 1.0, and excellent water resistance in an NCO/OH mole ratio of 0.9 to 1.5. In particular, the results show that, in the case of using a hardener including a reaction product of 3-cyclohexylaminopropane sulfonic acid and having a viscosity not more than 1,000 mPa·s/23° C., there is a large effect in improving penetrability of coated film.

In contrast to this, in Comparative example 1, since the NCO/OH mole ratio is less than 0.9, water resistance (appearance by visual observation and gloss retention) is low. In Comparative example 2, since the viscosity exceeds 1,000 mPa·s/23° C., penetrability is low. In Comparative example 3, although the viscosity is not more than 1,000 mPa·s/23° C., because of being modified with alkoxypolyoxyethylene glycol not with 3-cyclohexylaminopropane sulfonic acid, penetrability and water resistance (appearance by visual observation) are low. In Comparative example 4, penetrability is high because the viscosity is not more than 1,000 mPa·s/23° C., but since the hardener does not include a reaction product of a compound having both an active hydrogen and a hydrophilic group, water resistance (appearance by visual observation and gloss retention) is low.

INDUSTRIAL APPLICABILITY

The present invention can be used in a coating method called a wet-on-wet system, or a two-coat one-bake system in a coating field for steel plates and plastics of automobiles, home electric appliances, and the like, aiming at shortening of coating process, energy saving, and volatile organic compound (VOC) reduction. In particular, when applied to an aqueous base coat, since a specific polyisocyanate is used in a clear coat layer, it penetrates efficiently into an aqueous base coat layer of the under layer, and reacts with an isocyanate-reactive component in the aqueous base coat layer, adhesive strength between two layers is therefore greatly improved, and excellent physical properties of coated film can be obtained.

The invention claimed is:

1. A coating method comprising applying an aqueous base coat paint, without hardening the aqueous base coat paint by cross-linking, subsequently coating a clear coat paint comprising a hardener and an active hydrogen-containing resin on the base coat paint, hardening the base coat paint and the clear coat paint simultaneously by cross-linking, wherein the clear coat paint is a two-component polyurethane paint with a mole ratio of 0.9 to 2.0 in NCO/H (active hydrogen), wherein
   (1) the hardener comprises a reaction product of (i) a derivative of 1,6-hexamethylene diisocyanate comprising a trimer, wherein the amount of trimers of 1,6-hexamethylene diisocyanate in the derivative of 1,6-hexamethylene diisocyanate is 55 weight % or more and wherein the amount of diisocyanate monomers included in the derivative of 1,6-hexamethylene diisocyanate is 1 weight % or less, and (ii) a compound having both an active hydrogen and a hydrophilic group; and
   (2) viscosity of the hardener when it is not diluted with any organic solvent is not more than 1,000 mPa·s/23° C.

2. The coating method of claim 1, wherein the compound having both an active hydrogen and a hydrophilic group is a compound having an active hydrogen-containing group and a sulfo group represented by formula (I), and the sulfo group in a hardener is neutralized with a tertiary amine

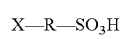

formula (I)

wherein
X is an amino group, alkylamino group, cycloalkylamino group, or hydroxyl group, and
R is an aliphatic and/or alicyclic hydrocarbon group.

3. The coating method of claim 2, wherein the compound represented by formula (I) is 2-(cyclohexylamino)-ethane sulfonic acid and/or 3-(cyclohexylamino)-propane sulfonic acid.

4. The coating method of claim 1, wherein the aqueous base coat paint is an aqueous baking type paint comprising an active hydrogen.

5. A multilayer coated film comprising a base coat layer and a clear coat layer obtained by the method of claim 1.

* * * * *